3,399,963
PREPARATION OF THIOPHOSPHORIC ACID
Stanley J. Brois, Matawan, N.J., assignor to Esso Research and Engineering Company, a corporation of Delaware
No Drawing. Filed Mar. 4, 1965, Ser. No. 437,314
21 Claims. (Cl. 23—139)

ABSTRACT OF THE DISCLOSURE

Thiophosphoric acid ($H_3PO_3S$) is prepared by the reaction of a sulfide of phosphorus with water in the presence of an oxygen-containing organic compound at moderate temperatures. The preferred phosphorous reagent is phosphorous tetrasulfide. Organic ketones and ethers having from about 3 to 12 carbon atoms are particularly effective organic reagents.

---

The present invention relates to a method for the preparation of thiophosphoric acid. More particularly, the invention deals with the formation of thiophosphoric acid directly from sulfides of phosphorus.

Various methods have been proposed in the literature for the preparation of thiophosphoric acid. For example, R. Klement (Zeitschrift für anorganische Chemie, 253, 237–248 (1947)) reported that thiophosphoric acid could be prepared by the double decomposition reaction of either hydrated barium tetrathiophosphate or barium dithiophosphate with sulfuric acid followed by the decomposition of the intermediate compound at temperatures of about 0° C. for periods of twelve hours to secure thiophosphoric acid. This preparation is extremely unsatisfactory from a commercial point of view since the barium thiophosphate compounds must first be prepared and the resulting double decomposition of the thiophosphate compound to the desired thiophosphoric acid involves inordinately long reaction periods.

Now, in accordance with this invention, it has been found that thiophosphoric acid can be prepared directly by the reaction of a sulfide of phosphorus with water in the presence of an oxygen-containing organic compound at moderate temperature conditions and at about atmospheric pressure. The reaction proceeds quite quickly and maximum yields of thiophosphoric acid are secured within an an eight-hour reaction period. The fact that thiophosphoric acid can be prepared by the reaction of sulfides of phosphorus with water in the presence of an oxygen-containing organic cr mpound is completely unexpected. For example, the reaction of phosphorous pentasulfide with water in either an acid or basic environment results only in the formation of orthophosphoric acid and hydrogen sulfide. This reaction is reported in a text entitled, "Phosphorus and Its Compounds," vol. I: Chemistry; John R. Van Wazer, Interscience Publishers, New York (1958), pp. 293–294.

In general, according to the process of the present invention, a sulfide of phosphorus, preferably phosphorus pentasulfide, which exists as a dimer, $P_4S_{10}$, is reacted with substantially pure water in the presence of a water soluble oxygen containing organic compound, i.e. organic ethers and ketones, to form relatively high yields of thiophosphoric acid. The reaction is evidenced by the formation of hydrogen sulfide and elemental sulfur.

Examples of useful phosphorous sulfide compounds include: phosphorous pentasulfide which exists as a dimer ($P_4S_{10}$); phosphorous sesquisulfide ($P_4S_3$); tetraphosphorous pentasulfide ($P_4S_5$); tetraphosphorous heptasulfide ($P_4S_7$), etc. Phosphorous pentasulfide is the preferred reagent because it is readily available at relatively low cost. The presence of minor amounts of impurities in the phosphorous sulfide does not materially diminish the extent and rate of the hydrolysis reaction.

The oxygen-containing organic compounds useful in the process of the present invention are substantially water soluble compounds that contain oxygen, preferably organic ethers, and ketones having from 3 to 12 carbon atoms. Particularly useful materials include straight chain, branched chain and cyclic aliphatic ketones and aryl ketones as well as straight chain, branched chain, and cyclic aliphatic ethers having from 3 to 8, most preferably 3 to 5, carbon atoms. Saturated as well as unsaturated ketones and ethers are equally operable. Representative non-limiting examples of useful $C_3$ to $C_8$ ethers and ketones include: tetrahydrofuran, tetrahydropyran, dioxane lower dialkyl ethers of alkylene glycols, specifically dimethyl or diethyl ethers of either ethylene glycol, diethylene glycol, or triethylene glycol; acetone, butanone, 3-pentanone, 2-pentanone, 3-hexanone, 2-hexanone, methyl ethyl ketone, methyl isobutyl ketone, acetylacetone, buten-3-one, 3-penten -2-one, cyclobutanone, cyclopentanone, cyclohexanone, etc. Particularly preferred reagents are aliphatic saturated straight chain ketones such as acetone and methyl ethyl ketone. Additionally, aliphatic alcohols such as methanol effect the hydrolysis of phosphorous sulfides to thiophosphoric acid but at a very slow rate.

In the process of the present invention, at least six gram moles of water are present in the reaction system for every gram mole of phosphorous sulfide used to insure substantially complete hydrolysis of the sulfide. The maximum amount of water used in the reaction depends primarily upon commercial considerations, i.e., when excessive amounts of water are used in the reaction a later stripping operation must be used in conjunction with the process in order to concentrate the product if such concentration is desired.

In most commercial operations, it is desirable to use from 6 to 20, preferably 6 to 12, moles of water with each gram mole of phosphorous sulfide. The amount of organic oxygen containing compound used in the reaction can vary over a wide range. Generally, it is desirable to use from 0.5 to 5 liters, preferably 1 to 2 liters of the organic compound per gram mole of phosphorous sulfide present in the reaction system.

Generally, temperatures within the range from less than 0 to about 25° C. can be used in the present process; however, temperatures within the range of from 10 to 20° C. are preferred. Pressures ranging from sub-atmospheric to atmospheric can be employed in the reaction. When reaction pressures in excess of atmospheric pressures are used, the free evolution of $H_2S$ is impeded and thus the reaction does not proceed to completion. The reaction times for the formation of thiophosphoric acid depend in general upon the temperatures and reagent concentrations used. Reaction times from 0.5 to 8.0, preferably 1 to 4 hours, are employed. It has been found that after a reaction period of 8 hours substantially no increase in yield is obtained.

The product of the instant hydrolysis reaction consists of a water solution of thiophosphoric acid which may contain minor amounts of unreacted phosphorous sulfide, free sulfur and entrained hydrogen sulfide. This raw product may be used directly as a process intermediate without further processing. Alternatively, substantially pure thiophosphoric acid can be obtained by filtering and concentrating the solution.

The reaction vessel used for the formation of thiophosphoric acid can be constructed of any material that is inert to the reactants used, and is capable of withstanding the operating pressures. Accordingly, reactors made of glass, stainless steel and glass-lined steel can be used.

In a typical preferred embodiment, a glass reaction flask equipped with a stirrer is charged with 1 gram mole of phosphorous pentasulfide and 1 to 2 liters of a saturated aliphatic ketone having from 3 to 8 carbon atoms. The mixture is stirred during reactant addition. To this well-stirred mixture is added dropwise from 6 to 12 gram moles of distilled water. Upon addition of the water, the reaction proceeds instantaneously as evidenced by the liberation of hydrogen sulfide and the gradual dissolution of the phosphorous pentasulfide. The reaction is strongly exothermic and the reaction temperature is maintained at a temperature of about 10 to 20° C. by external cooling with an ice bath. The reaction is permitted to proceed with continuous stirring for a period of from 2 to 4 hours.

Upon completion of the reaction, the reaction mixture is filtered or centrifuged at a temperature of about 0° C. to remove any unreacted phosphorous pentasulfide and any sulfur by-product. The filter cake is subsequently washed with either acetone, methanol, or diethyl ether or mixtures of these materials to remove all of the product from the filter cake. The filtration or centrifugation should be conducted and the resulting filtrate stored in an inert atmosphere since the presence of even minor amounts of atmospheric oxygen causes thiophosphoric acid to decompose. The thiophosphoric acid product can be diluted with either acetone or methanol and stored at 0° to −40° C. for later use. Alternatively, the filtrate may be simply stored in its concentrated form at temperatures between 0° and −40° C. Following the above reaction procedure thiophosphoric acid in yields of about 80% based on phosphorous pentasulfide are secured. Where a purified product is not desired, the raw thiophosphoric acid product from the reaction vessel can be used or stored without further processing.

Thiophosphoric acid as prepared by the process of the present invention has many varied uses. The material may be reacted with a broad range of amines and bases to form materials which are useful as components in pesticide compositions, lube oil additives, or in a fertilizer system.

This invention and its advantages will be further illustrated by the following examples:

EXAMPLE 1

Into a 1-liter, 2-neck round bottom glass reaction flask were added 111.1 grams (0.5 gram mole) of reagent grade phosphorous pentasulfide. To this compound were then added 200 mls. of acetone and the resulting mixture cooled to 0° C. To the vigorously agitated reaction mixture were added dropwise, 100 mls. of distilled water. Water should be introduced slowly into the diluent-phosphorous sulfide mixture because of the exothermic nature of the reaction. The temperature of the reaction flask and its contents was maintained at about 10° C. during the hydrolysis of the phosphorous pentasulfide. After all of the water was added to the phosphorous pentasulfide-acetone mixture, stirring was continued for 1½ hours at atmospheric pressure and the temperature was allowed to reach 25° C.

At the completion of the reaction period, the reaction flask was evacuated to remove any hydrogen sulfide present in the reaction mixture. After the evacuation period, 250 mls. of methanol diluent were added to the mixture and the total mixture was passed through filter cel to remove any unreacted phosphorous pentasulfide and sulfur formed in the reaction. The filtrate was then cooled below 0° C. and refiltered through filter cel under a nitrogen atmosphere. At the completion of the second filtering operation, 390 mls. of a clear supernatant were obtained. The reaction apparently proceeded according to the following non-stoichiometric equation:

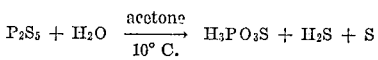

A 19.5 mls. aliquot of filtrate was titrated with a 1.0 normal tincture of iodine solution. The 19.5 mls. aliquot absorbed 38.5 mls. of the tincture of iodine solution indicating a 77% yield of thiophosphoric acid based upon phosphorous pentasulfiide.

EXAMPLE 2

A series of tests were conducted to illustrate the effectiveness of various types of aliphatic ethers as reaction diluents in the process of the present invention. In each of the tests, conducted at atmospheric pressure and room temperature, 5 grams of phosphorous pentasulfide and 20 ml. of reaction diluent were introduced into an Erlenmeyer flask. The resulting mixture was vigorously agitated and 5 ml. of water was introduced into the mixture dropwise while agitation was continued. The degree of effectiveness of the diluents was determined by the rate at which hydrogen sulfide was evolved from the reaction mixture, the temperature change encountered upon water addition, and the extent of dissolution of the phosphorous pentasulfide. The results of the tests are set forth in Table I below:

TABLE I

| Test No. | Reaction diluent | Amount $P_2S_5$ dissolved | Degree of $H_2S$ evolution | Temperature change (° C.)[1] |
|---|---|---|---|---|
| 1 | Distilled water | None | Very slow | None |
| 2 | Tetrahydrofuran | Complete amount | Fast | 22.5 |
| 3 | $CH_3OCH_2CH_2OCH_3$ [2] | do | Very fast | 18.0 |
| 4 | Dioxane | Small amount | Slow | 8.0 |
| 5 | Formaldehyde | do | Very slow | 1.0 |
| 6 | Nitromethane | do | do | 2.0 |
| 7 | Acetonitrile | do | do | 6.5 |
| 8 | Acetaldehyde | do | do | 1.0 |

[1] Change in temperature of reaction mixture upon addition of water.
[2] Dimethyl ether of ethylene glycol.

The above data indicate that when compounds such as tetrahydrofuran, dioxane, and the dimethyl ether of ethylene glycol are utilized as reaction diluents in the process of this invention the indicia of the thiophosphoric acid formation reaction, namely strong $H_2S$ evolution, exothermic reaction, phosphorous sulfide dissolution, etc., are present. In contradistinction, when other compounds are used as the reaction diluent, the indicia of the thiophosphoric acid formation reaction are not present.

The presence of many oxygen containing organic compounds such as aldehydes, alcohols, acids, etc. in the reaction mixture may promote the formation of extremely minor amounts of thiophosphoric acid over protracted periods of time. However, utilizing the ketone and ether compounds of the present invention, substantially stoichiometric yields of thiophosphoric acid are secured during relatively short reaction periods. The slow evolution of $H_2S$ is ordinarily always present when a phosphorous sulfide is contacted with water as hydrogen sulfide and orthophosphoric acid are the expected products of a phosphorous sulfide hydrolysis reaction.

After the completion of tests 2, 3 and 4, the reaction mixtures were reacted without further processing with t-butyl aziridine. The resulting aziridine salts formed exhibited infrared spectra identical to salts formed by the reaction of t-butyl aziridine and thiophosphoric acid.

Further advantages of this invention will be apparent to those skilled in the art. Thiophosphoric acid can be conveniently and efficiently prepared with the process of the present invention. It is to be understood that this invention is not limited to the specific example set forth herein, which has been offered merely as an illustration, and that modifications may be made without departing from the spirit and scope of the appended claims.

What is claimed is:

1. A process for the preparation of $H_3PO_3S$ which comprises reacting a sulfide of phosphorus with water in the presence of a water soluble organic compound selected from the group consisting of organic ketones and ethers for a time sufficient to obtain a substantial yield of $H_3PO_3S$.

2. The process of claim 1 wherein said organic compound is selected from the group consisting of organic ketones and ethers having from 3 to 12 carbon atoms.

3. The process of claim 1 wherein said organic compound is an organic ketone having from 3 to 12 carbon atoms.

4. The process of claim 1 wherein said organic compound is a saturated aliphatic ketone having from 3 to 8 carbon atoms.

5. The process of claim 1 wherein said organic compound is acetone.

6. The process of claim 1 wherein said organic compound is an organic ether having from 3 to 12 carbon atoms.

7. The process of claim 1 wherein said organic compound is an aliphatic ether having from 3 to 8 carbon atoms.

8. The process of claim 1 wherein said organic compound is tetrahydrofuran.

9. A process for the preparation of $H_3PO_3S$ which comprises reacting a sulfide of phosphorus with water in the presence of a water miscible organic compound selected from the group consisting of organic ketones and ethers having from 3 to 8 carbon atoms at about atmospheric pressure at a temperature of about 0 to 25° C. for a time sufficient to obtain a substantial yield of $H_3PO_3S$.

10. The process of claim 9 wherein the sulfide of phosphorus is phosphorous pentasulfide.

11. The process of claim 9 wherein said reaction is conducted at a temperature in the range of from about 10 to 20° C.

12. The process of claim 10 wherein said organic compound is acetone.

13. The process of claim 10 wherein said organic compound is tetrahydrofuran.

14. The process of claim 10 wherein said organic compound is a lower dialkyl ether of an alkylene glycol.

15. A process for the preparation of $H_3PO_3S$ which comprises reacting phosphorous pentasulfide with water in the presence of a water miscible, liquid organic compound selected from the group consisting of organic ketones and ethers having from 3 to 8 carbon atoms at atmospheric pressure at a temperature in the range of from about 10 to 20° C. for a time sufficient to obtain a substantial yield of said $H_3PO_3S$, the molar ratio of water to phosphorous pentasulfide varying from 6 to 12 and 0.5 to 5 liters of organic compound being present in said reaction system per mole of phorphorous pentasulfide, and recovering said $H_3PO_3S$.

16. The process of claim 15 wherein said organic compound is acetone.

17. The process of claim 15 wherein said organic compound is tetrahydrofuran.

18. The process of claim 15 wherein said organic compound is the dimethyl ether of ethylene glycol.

19. The process of claim 2 wherein the reaction is conducted at a temperature varying from about 0 to 25° C.

20. The process of claim 3 wherein said reaction is carried out at a temperature varying from about 0 to 25° C.

21. The process of claim 6 wherein said reaction is carried out at a temperature varying from about 0 to 25° C.

References Cited

Gmelin, "Handbuch Der Anorganischen Chemie," System-No. 16, Tiel C, 1965, pp. 572, 575 and 584.

OSCAR R. VERTIZ, *Primary Examiner.*

HERBERT T. CARTER, *Assistant Examiner.*